Feb. 28, 1956 M. LATSHAW 2,736,252
HARROWING AND WEEDING IMPLEMENT
Filed Aug. 2, 1954
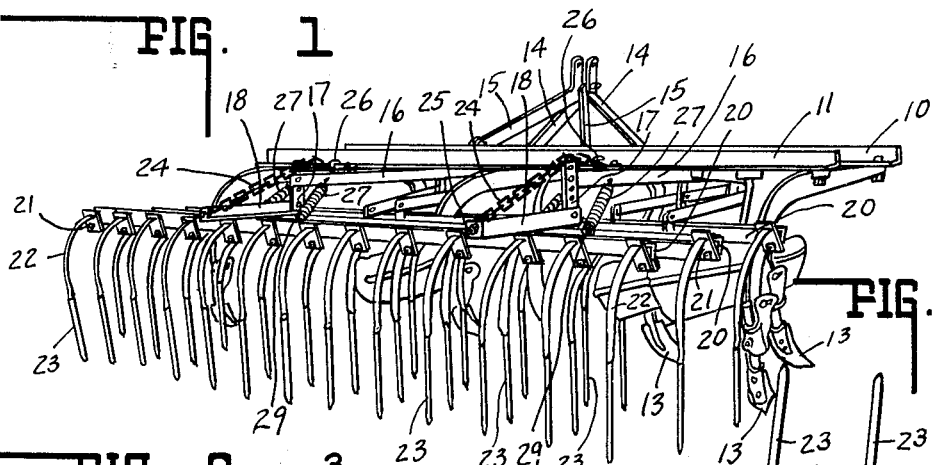
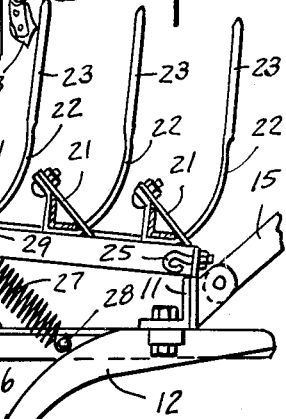
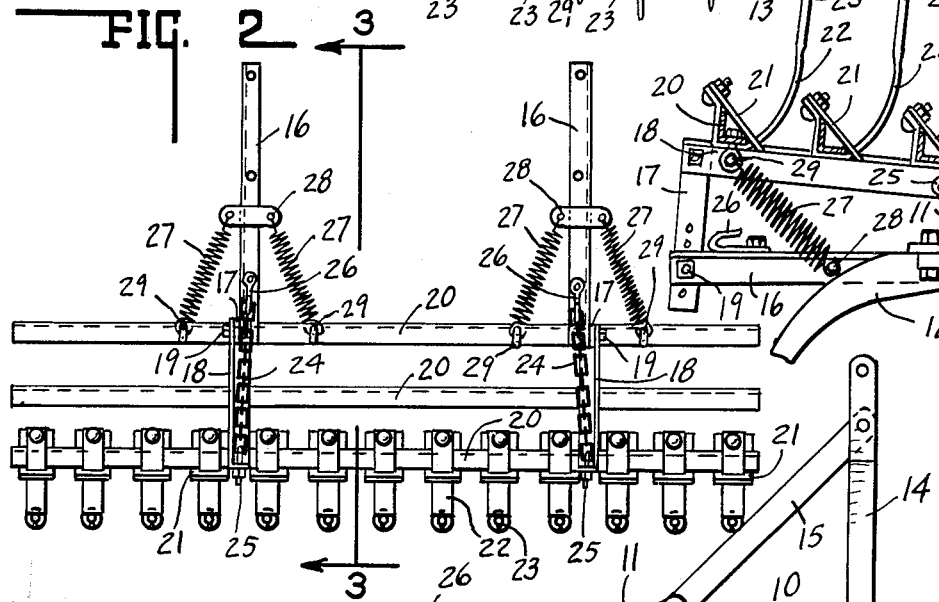
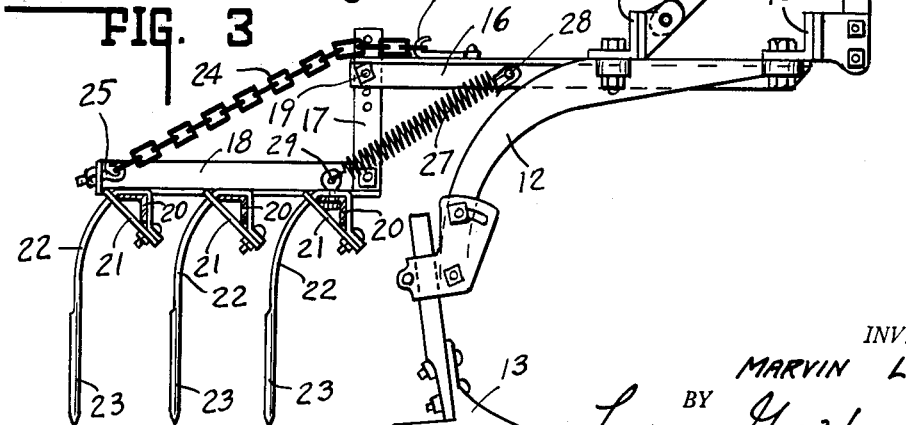
INVENTOR.
MARVIN LATSHAW.
BY
Lockwood, Galt, Woodard & Smith,
ATTORNEYS.

United States Patent Office 2,736,252
Patented Feb. 28, 1956

2,736,252

HARROWING AND WEEDING IMPLEMENT

Marvin Latshaw, Frankfort, Ind.

Application August 2, 1954, Serial No. 447,105

4 Claims. (Cl. 97—8)

This invention relates to a harrowing and weeding implement for attachment to a cultivator.

It is recognized that harrowing and weeding implements have heretofore been attached to cultivators, but because of their structure and manner of mounting have not been successful in operation, and it is therefore the purpose of this invention to improve upon the structure, and particularly in respect to the mounting on the cultivator and its control relative thereto.

This invention therefore contemplates a pair of angle iron extensions secured to the mounting frame of the cultivator to overhang rearwardly thereof, upon which is pivotally mounted an L-bar including a hanger strap pivotally supported to and depending from the rear end of each extension, and a rearwardly extending and horizontally disposed arm to which the weeder unit is secured. An adjustable chain or the like is connected between the extreme ends of the respective arms of the L-bar and angle iron extension for adjustably supporting the unit, and a pair of tension springs, connected between the lower end of the hanger straps and the angle iron extensions, urge the unit into ground engagement under spring tension, said springs also serving to secure the unit in inoperative position on top of the angle iron extensions when the L-bar is moved over center to rest thereon, all as more particularly set forth in the following specifications and illustrated in the drawings.

The full nature of the invention will be understood from the accompanying drawings and the following description and claims:

Fig. 1 is a perspective view showing a cultivator with the harrowing and weeding unit attached thereto.

Fig. 2 is a plan view of said unit.

Fig. 3 is a view taken on the line 3—3 of Fig. 2.

Fig. 4 is similar to Fig. 3, showing a portion thereof with the harrowing and weeding unit in inoperative position.

In the drawings there is shown a cultivator including a frame formed of a pair of parallel transversely extending angle irons 10 and 11, to which are rigidly secured a series of downwardly curved arms 12 having adjustably secured thereto the cultivator shovels 13. Extending upwardly from the angle iron 10 there is a pair of hitch straps 14 and a pair of braces 15. Extending rearwardly from the cultivator and rigidly secured to the angle irons 10 and 11 there is a pair of angle iron extensions 16 which mount the harrowing and weeding unit.

Pivotally connected to the outer ends of each of said extensions 16 there is an L-bar, each comprising a hanger strap 17 and a rearwardly extending substantially horizontal arm 18. Each of said hanger straps is adjustably and pivotally mounted to the end of the angle iron extensions 16, as indicated at 19. Extending transversely of the arm 18 there is a series of spaced parallel angle iron bars 20 about which there are bolted the securing and bracing straps 21 for mounting the tynes 22 terminating in the harrowing and weeding teeth 23.

The outer or rear end of the L-bars is adjustably supported by a chain 24. Said chain is connected at 25 to the free end of the arm 18 and is adjustably connected at 26 to the respective angle iron extension 16. Thus, the position of the weeding unit may be adjusted up or down, depending upon the lengthening or shortening of the supporting chain 24, swinging about the pivotal mounting 19. A pair of tension springs 27 is provided for each L-bar, each of said springs being connected at 28 to a strap secured to the angle iron extension 16, the other end of each of said springs being secured at 29 to the L-bar at the inner end of the arm 18 adjacent the lower end of the hanger strap 17.

Said springs 27 are mounted under tension so as to exert an inwardly pull on the hanger straps, urging the L-bar into downwardly tilting position to forcibly impress the teeth 23 against the ground. Thus, depending upon the adjustment of the chain 24 the teeth will be forced into the ground under tension of the springs 27. Said springs also serve to retain the L-bar and teeth in inverted position on top of the angle iron extension 16, as shown in Fig. 4, upon being swung to an over center position thereon. In this position the unit will be rendered inoperative with the teeth free of the ground or any obstructions for transposing the unit or permitting a cultivating operation with the harrowing or weeding operation.

The invention claimed is:

1. In combination with a cultivator having a supporting frame, a harrowing and weeding unit comprising a pair of angle iron extensions rigidly secured to said frame to overhang rearwardly thereof, a depending L-bar pivotally mounted on the rear ends of said extensions respectively including a pivoted hanger strap and a rearwardly extending arm rigidly connected thereto, a plurality of parallel bars carried transversely of said arms, a series of spaced spring harrowing and weeding teeth secured to said bars respectively in offset relation to extend downwardly therefrom, a supporting chain adjustably connected between the free end of each arm and extension respectively, and a spring connected under spring tension from said L-bar adjacent the lower end of said hanger strap and the central portion of said extension for urging said teeth downwardly.

2. In combination with a cultivator having a supporting frame, a harrowing and weeding unit comprising a pair of angle iron extensions rigidly secured to said frame to overhang rearwardly thereof, a depending L-bar pivotally mounted on the rear ends of said extensions respectively including a pivoted hanger strap and a rearwardly extending arm rigidly connected thereto, a plurality of parallel bars carried transversely of said arms, a series of spaced spring harrowing and weeding teeth secured to said bars respectively in offset relation to extend downwardly therefrom, a support adjustably connected between the free end of each arm and extension respectively, and a spring connected under spring tension from said L-bar adjacent the lower end of said hanger strap and the central portion of said extension for urging said teeth downwardly when said unit is in operative position and retaining it in inverted inoperative position when swung upwardly and over center.

3. The combination with a cultivator having a supporting frame, a harrowing and weeding implement comprising a plurality of spaced L-bar frames pivotally mounted at the rear of said supporting frame to extend downwardly and rearwardly therefrom, a series of spaced spring harrowing and weeding teeth mounted by said L-bars to extend downwardly therefrom, a support adjustably connected between said L-bar and supporting frame for retaining said teeth in adjusted and operative position, and a spring connected under tension between each of said L-bars and said supporting frame mounted to urge said L-bar and teeth downwardly, said springs being adapted to retain said L-bars and teeth in inoperative position under spring tension upon being swung upwardly and over center about the pivotal mounting thereof.

4. In combination with a cultivator having a supporting frame, a harrowing and weeding unit comprising a pair of angle iron extensions rigidly secured to said frame to overhang rearwardly thereof, a depending L-bar pivotally mounted on the rear ends of said extensions respectively including a pivoted hanger strap and a rearwardly extending arm rigidly connected thereto, a plurality of parallel bars carried tranasversely of said arms, a series of spaced spring harrowing and weeding teeth secured to said bars respectively in offset relation to extend downwardly therefrom, a support adjustably connected between the free end of each arm and extension respectively, and a pair of diverging springs connected under spring tension from said L-bar adjacent the lower end of said hanger strap and the central portion of said extension for urging said teeth downwardly.

References Cited in the file of this patent

UNITED STATES PATENTS

| | | |
|---|---|---|
| 1,127,560 | Wilson | Feb. 9, 1915 |
| 1,189,615 | Nelson et al. | July 4, 1916 |
| 1,541,162 | Mercer | June 9, 1925 |
| 2,612,825 | Walker | Oct. 7, 1952 |
| 2,646,657 | Robertson | July 28, 1953 |

FOREIGN PATENTS

| | | |
|---|---|---|
| 320,067 | France | Sept. 1, 1903 |